United States Patent
Zhu et al.

(10) Patent No.: US 7,643,429 B2
(45) Date of Patent: Jan. 5, 2010

(54) INTERFERENCE MEASURING AND MAPPING METHOD AND APPARATUS FOR WIRELESS NETWORKS USING RELAY STATIONS

(75) Inventors: Chenxi Zhu, Gaithersburg, MD (US); Dorin Viorel, Calgary (CA); Jagan Seshadri, Calgary (CA); Jonathan Agre, Brinklow, MD (US); Wei-Peng Chen, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 11/777,566

(22) Filed: Jul. 13, 2007

(65) Prior Publication Data

US 2008/0107035 A1 May 8, 2008

Related U.S. Application Data

(60) Provisional application No. 60/864,491, filed on Nov. 6, 2006, provisional application No. 60/891,096, filed on Feb. 22, 2007.

(51) Int. Cl.
  *H04J 1/16* (2006.01)
(52) U.S. Cl. .............. 370/241; 370/252; 370/203; 370/208; 455/67.11; 455/63.1; 455/67.13; 455/562.1; 375/148; 375/147; 375/267

(58) Field of Classification Search .............. 370/241, 370/252, 203, 208, 329; 455/67.11, 63.1, 455/67.13, 562.1; 375/148, 147, 267
See application file for complete search history.

(56) References Cited

U.S. PATENT DOCUMENTS

| 6,718,184 | B1 * | 4/2004 | Aiken et al. ............. 455/562.1 |
| 7,006,823 | B2 * | 2/2006 | Shurvinton et al. ....... 455/422.1 |
| 7,068,977 | B1 * | 6/2006 | Yang et al. ............... 455/67.13 |
| 7,327,812 | B2 * | 2/2008 | Auer ......................... 375/347 |
| 2002/0075967 | A1 * | 6/2002 | Voyer ......................... 375/267 |
| 2002/0196804 | A1 * | 12/2002 | Ishiguro et al. ............. 370/442 |
| 2003/0073441 | A1 * | 4/2003 | Fattouch ..................... 455/446 |
| 2004/0136445 | A1 * | 7/2004 | Olson et al. ................ 375/148 |
| 2005/0069024 | A1 * | 3/2005 | Li et al. ...................... 375/148 |
| 2007/0207769 | A1 * | 9/2007 | Hara ........................... 455/403 |

* cited by examiner

*Primary Examiner*—Ricky Ngo
*Assistant Examiner*—Rasheed Gidado
(74) *Attorney, Agent, or Firm*—Staas & Halsey LLP (57) ABSTRACT

Interference levels occurring at one or more stations in a wireless network, where each of said one or more stations is a base station or a relay station. The measured interference levels are mapped by building a first matrix including noise plus interference occurring at each of the one or more stations, respectively, and scheduled transmissions at predetermined times by each relay station respectively are mapped by building a second matrix. The first matrix and the second matrix are multiplied in order to determine the noise plus interference impact upon each base station by each relay station so that a network schedule can be generated in order to increase bandwidth efficiency in the network.

17 Claims, 6 Drawing Sheets

FIG. 6 ically, such as mobile stations (such as cell phones, etc.).

INTERFERENCE MEASURING AND MAPPING METHOD AND APPARATUS FOR WIRELESS NETWORKS USING RELAY STATIONS

CROSS-REFERENCE TO RELATED APPLICATIONS

This application is based on, and claims the benefit of a U.S. Provisional Application No. 60/864,491, titled "INTERFERENCE MAPPING PROCEDURE FOR OFDMA NETWORKS USING RELAY STATIONS", filed Nov. 6, 2006, inventors Chenxi Zhu, Dorin Viorel, Jagan Seshadri, Jonathan Agre and Wei-Peng Chen, and which is incorporated herein by reference.

In addition, this application is based on, and claims the benefit of a U.S. Provisional Application No. 60/891,096, titled "INTERFERENCE MAPPING PROCEDURE FOR OFDMA NETWORKS USING RELAY STATIONS", filed Feb. 22, 2007, inventors Chenxi Zhu, Dorin Viorel, Jagan Seshadri, Jonathan Agre and Wei-Peng Chen, and which is incorporated herein by reference

BACKGROUND OF THE INVENTION

Description of the Related Art

Wireless communication networks have become increasingly popular and generally include a base station that provides service to a cell area located around the base station. Subscriber stations, including mobile stations (such as cell phones, etc.), are able to communicate with the base station when they are within the service area (such as the cell area) of the base station.

Interference among stations in the same or different cells of the network can cause significant problems. The use of relay stations in the network can complicate interference problems.

SUMMARY OF THE INVENTION

Various embodiments of the present invention provide a method and apparatus which (a) measures interference levels occurring at one or more stations in a cluster of cells in a wireless network, where each of said one or more stations is a base station or a relay station; (b) maps the measured interference levels by building a first matrix including noise plus interference occurring at each of the one or more stations, respectively; (c) maps scheduled transmissions at predetermined times by each relay station respectively by building a second matrix; and (d) determines a noise plus interference impact upon each base station by each relay station by multiplying the first matrix by the second matrix at various points in time.

Various embodiments of the present invention provide a method and apparatus which (a) measures interference levels occurring in one or more stations in an Institute of Electrical and Electronics Engineers (IEEE) 802.16 Orthogonal Frequency Division Multiple Access (OFDMA) system, each station of said one or more stations being a base station or a relay station; (b) maps the measured interference levels by building a first matrix including noise plus interference occurring at each of the one or more stations, respectively; (c) maps scheduled transmissions at predetermined times by each relay station respectively by building a second matrix; and (d) determines a noise plus interference impact upon each base station by each relay station by multiplying the first matrix by the second matrix. Thereby, various embodiments of the present invention are capable of generating a network schedule, based on the determined noise plus interference impact.

The above embodiments of the present invention are simply examples, and all embodiments of the present invention are not limited to these examples or to including all the features described in the Summary of the Invention section of this application.

Additional features of the invention will be set forth in part in the description which follows, and, in part, will be obvious from the description, or may be learned by practice of the invention.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

In wireless communication networks, due to such effects as shadowing arising from blockage by buildings and other obstructions between transmission/reception antennas, there exist dead zones in which communication with the base station is not possible, despite being within the service area. To combat this problem, in a wireless network, such as for example, an Orthogonal Frequency Division Multiple Access (OFDMA) network, relay stations can be employed for providing enhanced transmission capabilities by acting as intermediaries between mobile stations operating in the network and the base station. In this manner, a mobile station that is incapable of connecting directly to a base station within its cell service area may still connect indirectly to the base station by first communicating with a relay station that does have a direct link, or possibly an indirect link through additional relay stations, to the base station.

A problem arises, however, in that greater levels of interference are produced in the network with the addition of base and relay stations. Since the increased intranet interference degrades the carrier to interference-plus-noise ration (CINR)

for the impacted links, properly scheduling the concurrent transmissions to mitigate the interference levels impacts directly the quality of service (QoS) on these links.

Therefore, a network entity schedule algorithm can be defined that minimizes the intranet interference between different stations (either base stations or relay stations) operating within the wireless network (e.g., an OFDMA network), thereby optimizing CINR degradation and thus allowing higher coding rates to be used on the impacted links.

Figure 1:
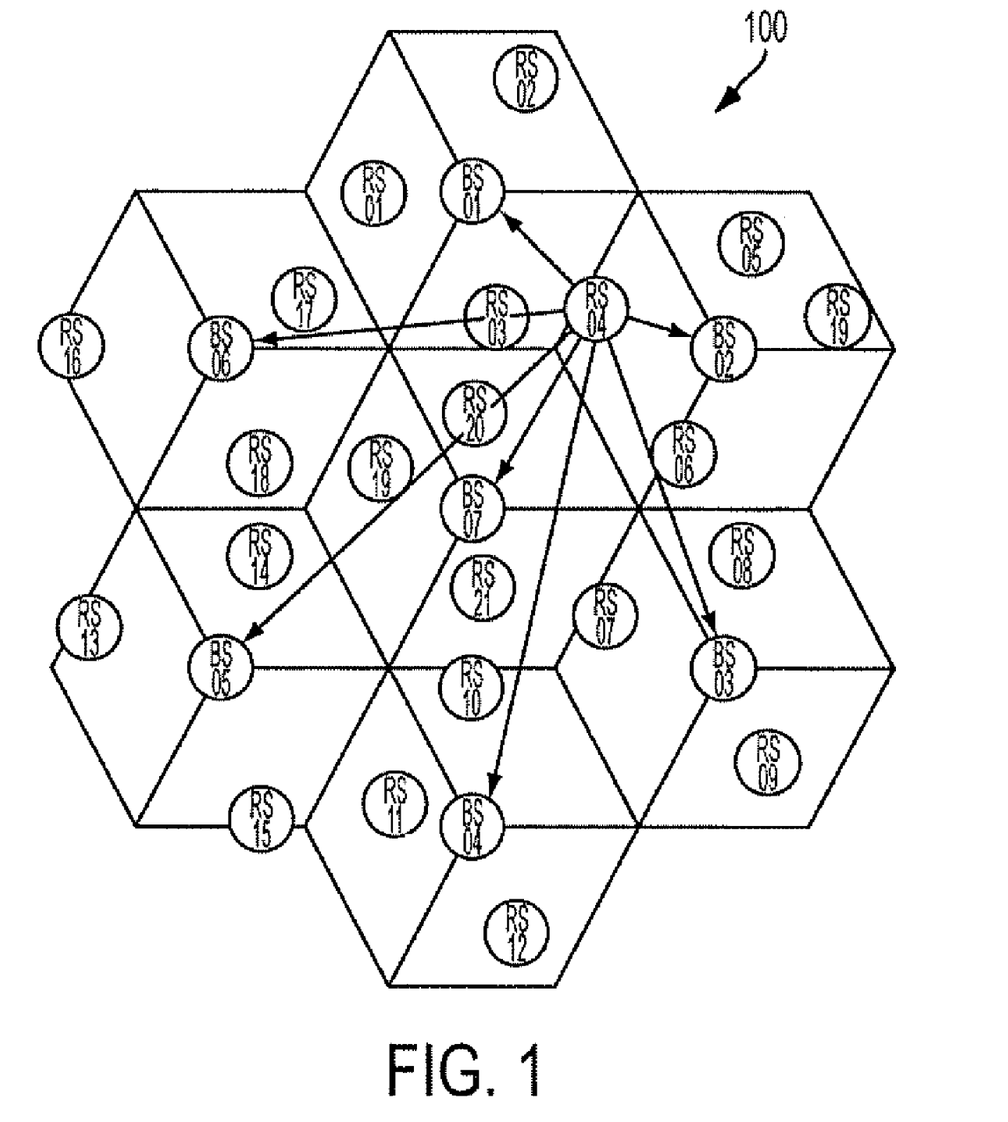
FIG. 1 is an illustration of an example of a "honeycomb" cluster of cells in a wireless network topology involving base stations and relay stations operating in an OFDMA network under the IEEE 802.16 standard.

FIG. 1 is an illustration of an example of a "honeycomb" cluster of cells 100 in a wireless network topology involving base stations and relay stations operating in an OFDMA network under the IEEE 802.16 standard. The cluster of cells 100 includes a plurality of relay stations (RS01-RS21) and a plurality of base stations (BS01-BS07) within the cluster of cells 100. This example topology is intended to show a single possibility of a network cell, and embodiments of the present invention are not limited to any particular topology. For example, embodiments of the present invention are not limited to a network with the specific number of base and/or relay stations in the specific configuration shown in FIG. 1, or a honeycomb cluster of cells, or to a honeycomb having the specific number of cells shown in FIG. 1.

In the specific example in FIG. 1, RS04 is shown transmitting a network interference mapping pattern (described in detail below) to all the base stations BS01-BS07, which is used for mapping interference levels occurring at various stations. Of course, the transmissions shown in FIG. 1 are merely illustrative examples and the present invention is not limited to which station or stations transmit and receive the network interference mapping pattern or any other transmission.

Various embodiments of the present invention assume a fixed reuse pattern. That is, the base stations and relay stations are assumed to be in fixed positions and each transmitter (either a base station or a relay station) transmits with a fixed power assigned by a network management entity (not depicted). However, the present invention is not limited to a fixed reuse pattern and it is also not limited to fixed relay stations.

Figure 2:
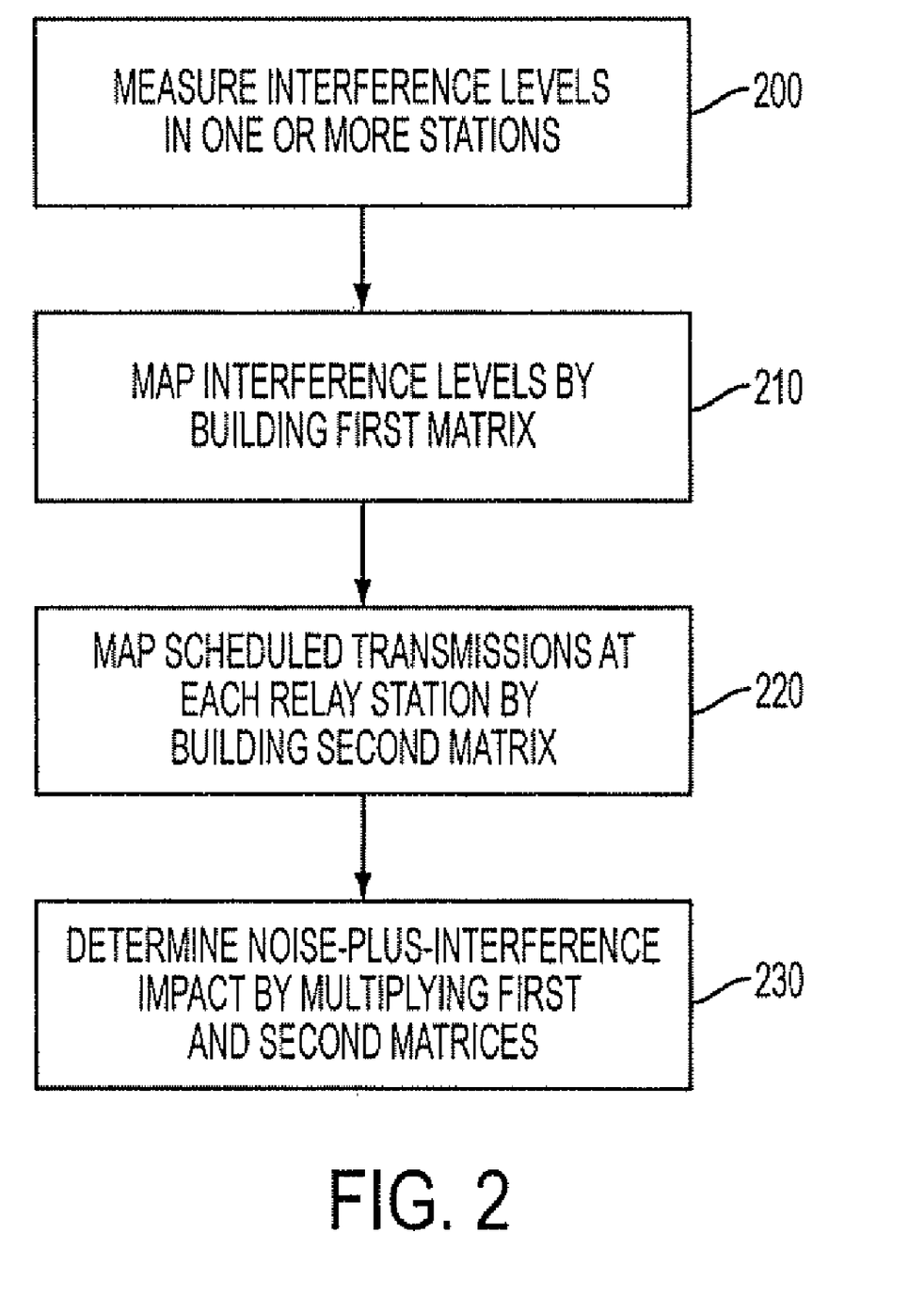
FIG. 2 is a flowchart illustrating the method of measuring interference levels occurring at one or more stations in a wireless network, mapping the interference levels and scheduled transmissions at relay stations by building first and second matrices and determining the noise plus interference impact upon each base station by each relay station, according to embodiments of the present invention.

FIG. 2 is a flowchart illustrating the method of measuring interference levels occurring at one or more stations in a wireless network, mapping the interference levels and scheduled transmissions at relay stations by building first and second matrices and determining the noise plus interference impact upon each base station by each relay station, according to embodiments of the present invention. Referring now to FIG. 2, at operation 200, interference levels occurring at one or more stations in a wireless network are measured, where each of the stations is either a base station or a relay station. Details of operation 200 will be further provided with reference to FIG. 3 below.

Figure 3:
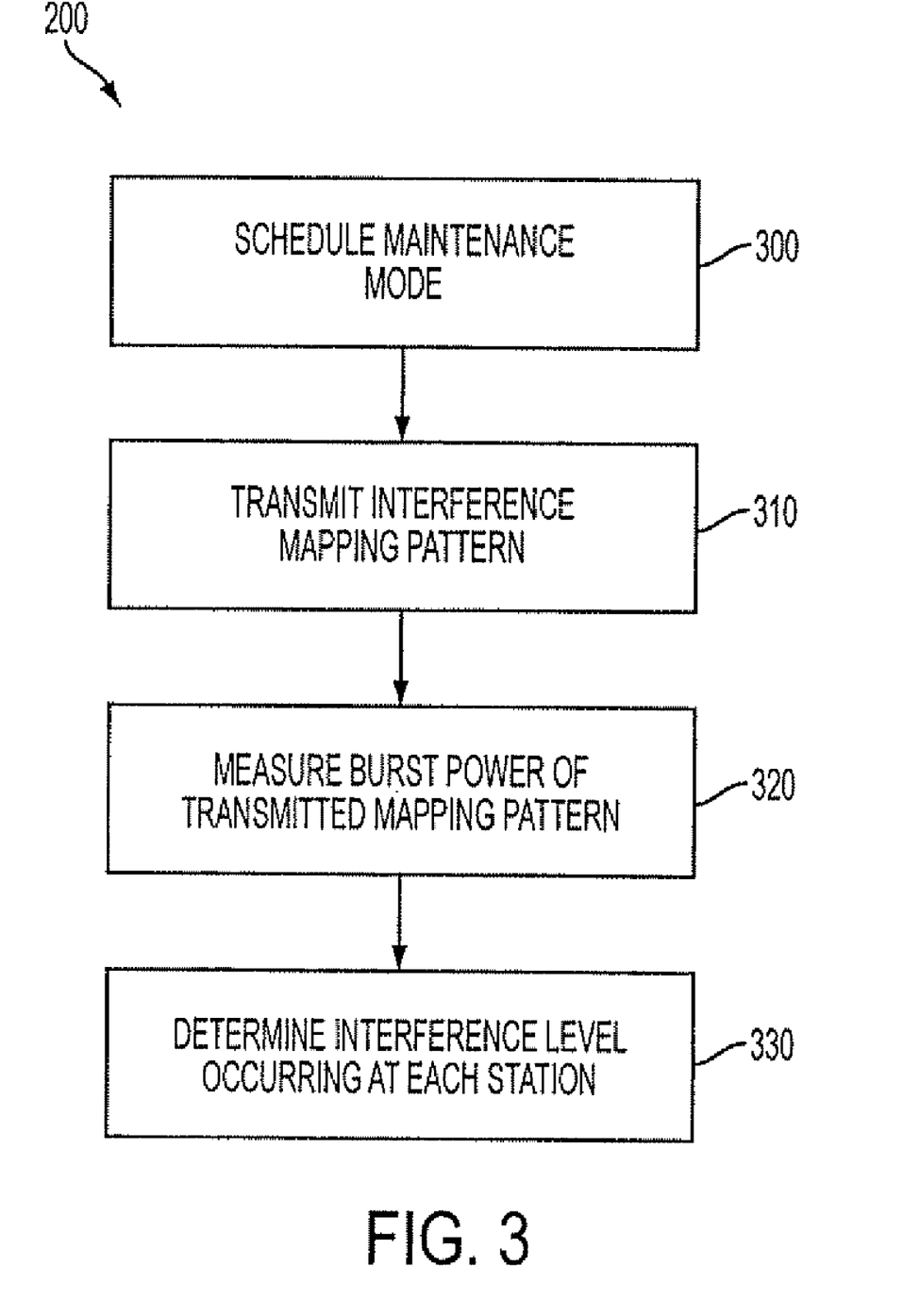
FIG. 3 is a flowchart illustrating the method of measuring interference levels, according to embodiments of the present invention.

Referring now to the interference level measuring operation 200 depicted in FIG. 3, at operation 300 a maintenance mode is scheduled for measuring the interference levels in the stations. The measuring interference mode is, for example, a maintenance type of operation, in which an implementation-specific network interference mapping pattern is transmitted from a station using, for example, a constant RF power.

Thus, from operation 300, the process moves to operation 310, in which the interference mapping pattern is transmitted from a station. As an example, each relay station within the cluster of cells subject to the interference measuring transmits within the same uplink (UL) frame, a specific UL interference pattern based, for example, on a specific UL sounding sequence. Upon receiving the UL interference patterns, all stations within the cluster of cells execute, for example, execute burst noise power measurements on the received UL interference patterns. Of course, the present invention is not limited to any particular UL interference pattern based on any specific UL sounding sequence, or to stations executing any particular burst noise power measurements.

One UL sounding burst may contain, for example, 18 subcarriers. Based on this value, the following maximum number of UL interference sounding patterns could be used per sector and cell, where the maximal number of UL interference sounding patterns represents the maximal number of relay stations the algorithm could monitor, and the Average Per Cell represents the average number of relay stations that could be monitored for a cluster of cells, employing, for example, a relay station UL relay zone of ten symbols, fully allocated for the interference measurement:

|  | 512 FFT | | 1024 FFT | | 2048 FFT | |
| --- | --- | --- | --- | --- | --- | --- |
|  | Average Per Cell | Total | Average Per Cell | Total | Average Per Cell | Total |
| PUSC (Partial Usage of SubChannels) | 6 | 45 | 15 | 90 | 30 | 180 |
| AMC 2x3 (Adaptive Modulation and Coding) | 7 | 48 | 16 | 96 | 34 | 192 |

One silence symbol, for example, may follow a one-symbol UL interference sounding pattern in order to allow non-synchronized power measurements (across different cells). Of course, the present invention is not limited to any particular measurements being included in the executed burst power measurements.

Figure 4:
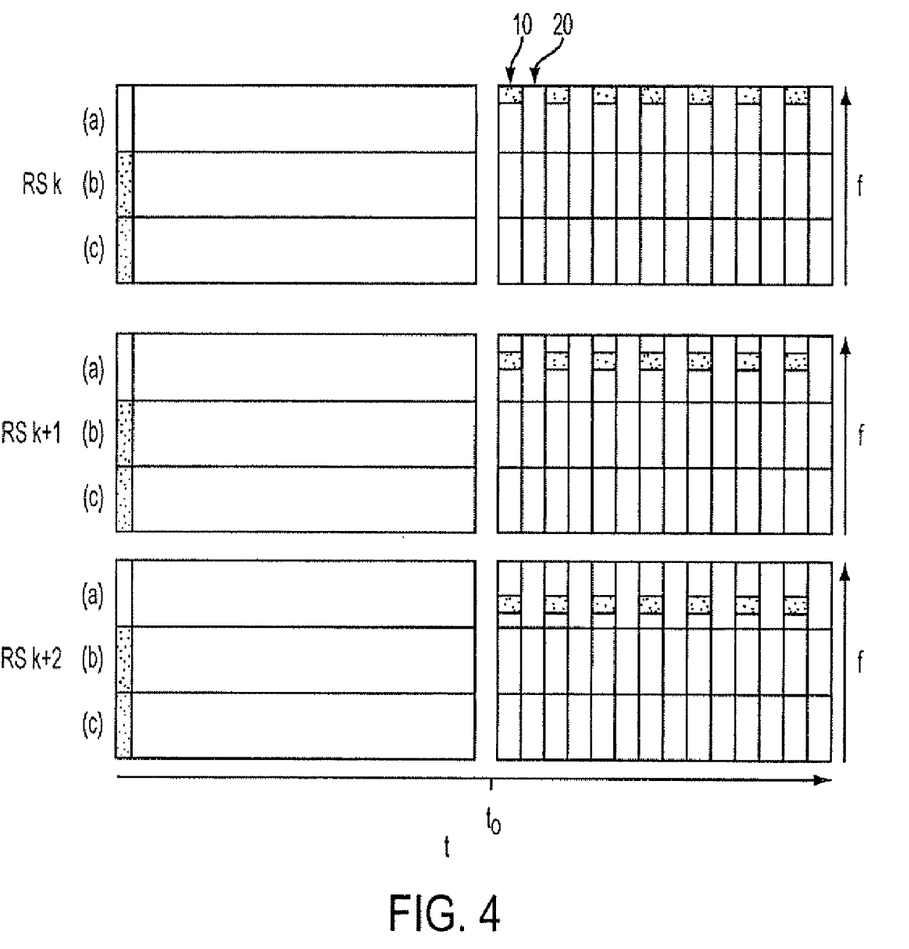
FIG. 4 is an example of portions of UL interference sounding patterns transmitted from a plurality of relay stations operating in a cell within a cluster of cells.

Referring to FIG. 4, as an example of portions of UL interference sounding patterns transmitted from a plurality of relay stations, RS k, RS k+1 and RS k+2 represent three different relay stations operating in a cell within a cluster of cells. It is noted that the present invention is not limited to any specific number of relay stations or base stations within a given cell or cluster of cells. At a specific point to, the relay stations begin transmitting respective UL interference sounding patterns at distinct frequencies. The sounding patterns are non-overlapping and, within a cluster of cells, each relay station will use a unique frequency band of 18 consecutive subcarriers, for example. In the example depicted in FIG. 4, each relay station is capable of transmitting in three frequency segments (a), (b) and (c). In this example, each relay station transmits a sounding pattern using a distinct frequency band within frequency segment (a). However, it is noted that the relay stations are not required to use the same frequency segment, and each station could transmit the sounding pattern in distinct frequency segments.

In this example, as shown by the pattern generated by RS k, one silence symbol 20 follows the one-symbol transmission 10 in order to allow non-synchronized power measurements across various cells in the cluster of cells due to propagation time. The present invention is not limited to any particular number of pairs of symbols 10 and silence symbols 20, and the number of pairs involved could be increased depending on the number of relay stations involved in the measurements. Further, the UL interference pattern described above is only one example, and one of ordinary skill in the art would appreciate that various sounding patterns and methods of transmitting the sounding patterns could be employed without departing from the principles of the present invention.

Referring back to FIG. 3, from operation 310, the process moves to operation 320 where the burst power of the transmitted mapping pattern is measured. For example, the burst power measurements executed by the stations are implementation specific and could include, for example, Received Signal Strength Indication (RSSI) measurements or, for example, Carrier to Interference Plus Noise Ration (CINR) measurements. These burst power measurements are, for example, proportional with the interference path between stations sending and receiving the UL interference patterns. It is noted that measuring burst powers may occur at one or more base stations or one or more super-ordinated relay stations.

From operation 320, the process moves to operation 330 where the network management entity determines interference levels occurring at each station based on the measured burst powers. According to various embodiments of the present invention, the network interference mapping pattern is scheduled, for example, periodically by the network management entity. Each base station then, for example, averages the received burst power measurements from each station and transmits the averaged measurements to network management entity to generate the interference matrix. However, the present invention is not limited to periodic scheduling of network interference mapping, or to any particular types of calculations.

Referring back to FIG. 2, from operation 200, the process moves to operation 210, where the measured interference levels are mapped by building a first matrix including noise plus interference occurring at each of the one or more stations.

For example, a network management entity (not shown) produces a mapped interference matrix based, for example, on noise plus interference measurements performed by different stations positioned within a cluster of cells subject to the interference mapping. That is, the interference matrix includes the noise plus interference generated by each station upon each other station.

An example interference matrix (INT) shown below maps the noise plus interference caused by each station upon each other station in the wireless network. As shown in this example, $NI_{i,j}$ represents the noise (N) plus interference (I) caused by station "i" upon station "j". The effect is not necessarily symmetrical due to the potential different transmission powers of the stations, although it is assumed that each transmitter transmits with a fixed power. This example shows a square Y×Y matrix, but the matrix could also be an Y×M matrix.

$$INT = \begin{bmatrix} NI_{1,1} & NI_{1,2} & NI_{1,3} \\ NI_{2,1} & NI_{2,2} & NI_{2,3} \\ NI_{3,1} & NI_{3,2} & NI_{3,3} \end{bmatrix}$$

The present invention is not limited to this specific manner of mapping the interference levels, and other manners of mapping the interference levels can be implemented. More specifically, the present invention is not limited to the mapping the interference levels by estimation of the interference matrix as described above.

From operation 210, the process moves to operation 220, where scheduled transmissions at predetermined times by each relay station respectively are mapped by building a second matrix. The predetermined times may be determined, for example, by a network management entity.

The second matrix RS(t) includes the relay station scheduled transmissions denoted by $RS_{a,b}$ at different points in time, where a is the relay station number and b is the time at which the interference takes place. An example of matrix RS(t) is shown below:

$$RS(t) = \begin{bmatrix} RS_{1,t0} & RS_{2,t0} & RS_{3,t0} \\ RS_{1,t1} & RS_{2,t1} & RS_{3,t1} \\ RS_{1,t2} & RS_{2,t2} & RS_{3,t2} \end{bmatrix}$$

This example shows a square Y×Y matrix, but the matrix could also be an Y×M matrix. Further, the present invention is not limited to this specific manner of mapping the relay stations, and other manners of mapping can be implemented within the scope of the present invention.

From operation 220, the process moves to operation 230 where the first and second matrix are multiplied in order to determine a noise plus interference impact upon each base station by each relay station at different points in time.

To compute the effect of all relay stations on a given base station at a given time t, the following equation is performed, where SCH(t) represents the CINR degradation by the relay stations located in the same cluster of cells upon existing base stations within the same cluster:

$$SCH(t) = RS(t) * INT,$$

or:

$$SCH(t) = \begin{bmatrix} RS_{1,t0} & RS_{2,t0} & RS_{3,t0} \\ RS_{1,t1} & RS_{2,t1} & RS_{3,t1} \\ RS_{1,t2} & RS_{2,t2} & RS_{3,t2} \end{bmatrix} * \begin{bmatrix} NI_{1,1} & NI_{1,2} & NI_{1,3} \\ NI_{2,1} & NI_{2,2} & NI_{2,3} \\ NI_{3,1} & NI_{3,2} & NI_{3,3} \end{bmatrix}$$

Figure 5:
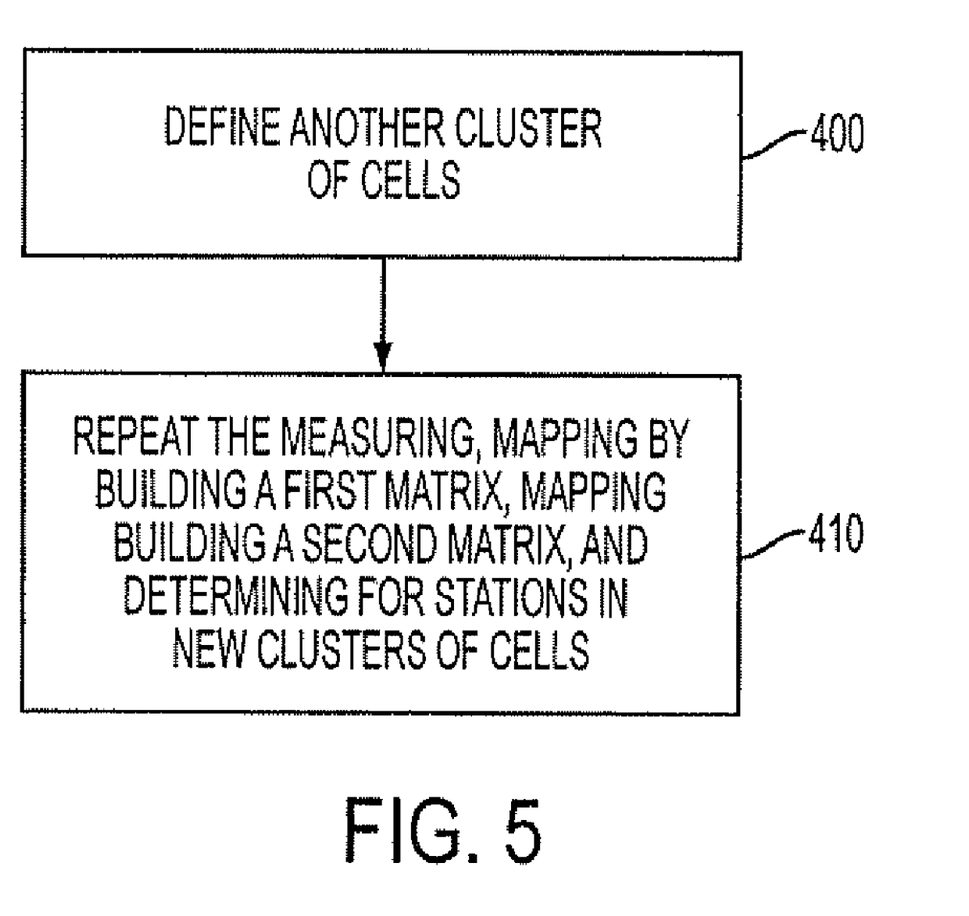
FIG. 5 is a flowchart illustrating the method of defining another cluster of cells and repeating the measuring, mapping and determining procedures, according to embodiments of the present invention.

FIG. 5 is a flowchart illustrating the method of defining another cluster of cells and repeating the measuring, mapping and determining procedures, according to embodiments of the present invention. Referring now to FIG. 5, at operation 400 another cluster of cells within the wireless network is defined. Measuring interference levels only within the original cluster of cells, for example a tier 1 cluster of cells, may not be sufficient to properly map all the interference interactions between all stations within the network. That is, interference interactions may appear between the original tier 1 cluster of cells under analysis at a given moment and a tier 2 cluster of cells affecting interference levels at the stations within the tier 1 cluster of cells.

From operation 400, the process moves to operation 410, where the measuring, mapping by building a first matrix, mapping by building a second matrix and determining operations (see FIG. 2) are repeated for stations within the tier 2 cluster of cells. As a result, measuring, mapping a determining procedures may be completed for the tier 1+2 cluster of cells.

Of course, the process in FIG. 5 is only one example of a process measure and map interference levels at all stations in all clusters within a wireless network. The present invention is not limited to the specific example in FIG. 5. For example, the present invention is not limited to including each of the specific operations in FIG. 5. Moreover, there are many variations of the specific operations in FIG. 5 that can be implemented.

Figure 6:
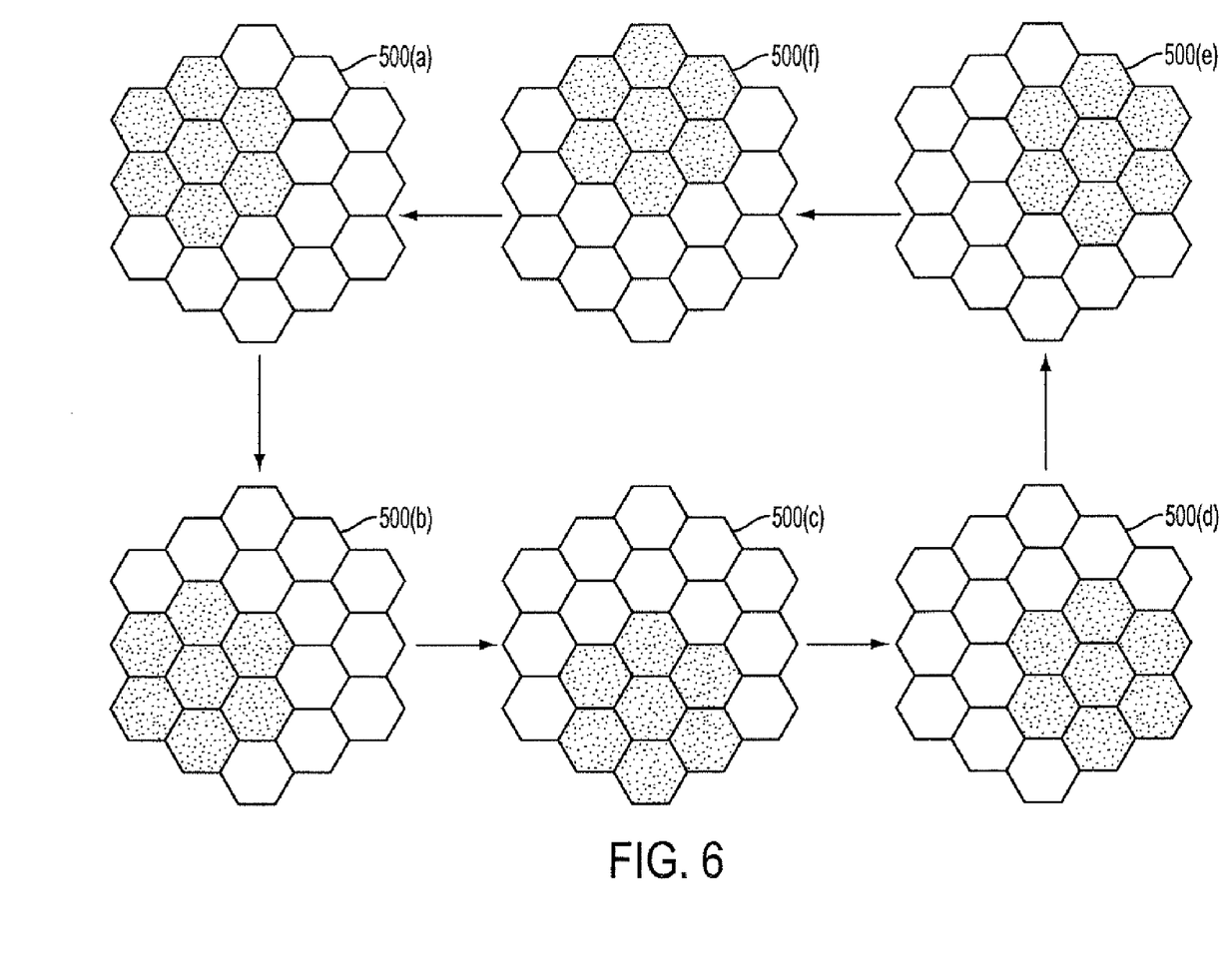
FIG. 6 is a diagram showing newly defined honeycomb clusters of cells in a wireless network topology so that all cells are subject to measuring, mapping and determining procedures, according to embodiments of the present invention.

After a given period of time determined, for example, by the network management entity, new tier 1 and tier 2 groups of cells may be defined. For example, FIG. 6 is a diagram showing newly defined honeycomb clusters of cells in a wireless network topology so that all cells are subject to measuring, mapping and determining procedures, according to embodiments of the present invention. This example topology is intended to show a single possibility of clusters of network cells (i.e., honeycomb clusters), and embodiments of the present invention are not limited to any particular topology.

Referring now to FIG. 6, reference numerals 500(a)-500(f) show all the cells in the wireless network with the shaded cluster as the cluster subject to the measuring, mapping and determining procedures at a given time. As shown in the example of FIG. 6, a tier 1 cluster is defined at 500(a) and new clusters are defined sequentially, as shown in 500(b)-500(f). As shown in this example, some cells in a shaded cluster are included in the shaded proceeding and/or succeeding cluster, so that the noise plus function impact upon each station in a cluster by one or more stations in another cluster may be measured.

According to this example, all of the clusters of cells may be efficiently mapped in six frames. Considering, as an example, a frame duration of 5 ms, the total allocated time for a complete tier 1+2 interference mapping would be 30 ms. Of course, the present invention is not limited to a specific frame duration, and the total time could be allocated in six sequential frames or in six separate frames (non-contiguous in time), depending on network congestion. In other words, the measurements could be scheduled by the network management entity periodically during less congested time frames of the network. In addition, because one mapping procedure may not be accurate enough, the measurements may be repeated and averaged over a predetermined time determined by the network management entity, for example.

As a further example, the total interference mapping capacity (expressed in total number of mapped relay stations) of the foregoing algorithm within 30 ms is given by the following table:

|  | 512 FFT | 1024 FFT | 2048 FFT |
| --- | --- | --- | --- |
| PUSC | 270 | 540 | 1080 |
| AMC 2x3 | 288 | 576 | 1152 |

As a result of determining a noise plus interference impact upon each base station by each relay station, the network management entity generates a network schedule in real time such that the interference between entities (either base stations or relay stations) is mitigated. The bandwidth can be efficiently allocated using, for example, the reuse pattern by assigning resources to individual reuse sets including a maximum number of base stations and relay stations, while, for example, maintaining a cumulative transmission level below the predetermined threshold interference level An example of using interference impacts to schedule transmissions can be found in Provisional Application titled "REUSE PATTERN NETWORK SCHEDULING ALGORITHM FOR OFDMA NETWORKS USING RELAY STATIONS", U.S. Ser. No. 60/864,498, filed Nov. 6, 2006, inventors Chenxi Zhu, Dorin Viorel, Jagan Seshadri, Jonathan Agre and Wei-Peng Chen, and which is incorporated herein by reference in its entirety, and U.S. Utility Application titled "REUSE PATTERN NETWORK SCHEDULING USING INTERFERENCE LEVELS", U.S. Ser. No. 11/777,385, filed Jul. 13, 2007, inventors Chenxi Zhu, Dorin Viorel, Jagan Seshadri, Jonathan Agre and Wei-Peng Chen, and which is incorporated herein by reference in its entirety. However, the present invention is not limited to the methods of generating network schedules described by the aforementioned provisional and utility applications.

Another example of can be found in Provisional Application titled "LOAD-BASED MMR NETWORK SCHEDULING ALGORITHM WITH FREQUENCY REUSE", U.S. Ser. No. 60/884,464, filed Jan. 11, 2007, inventors Chenxi Zhu, Dorin Viorel, Jagan Seshadri, Jonathan Agre and Wei-Peng Chen, and which is incorporated herein by reference, and Non-Provisional Application titled "REUSE PATTERN NETWORK SCHEDULING USING LOAD LEVELS", U.S. Ser. No. 11/777,494, filed Jul. 13, 2007, inventors Chenxi Zhu, Dorin Viorel, Jagan Seshadri, Jonathan Agre and Wei-Peng Chen, and which is incorporated herein by reference. However, the present invention is not limited to the methods of generating network schedules described by the aforementioned provisional and utility applications.

Various embodiments of the present invention provide a method and apparatus which (a) measures interference levels occurring at one or more stations in a cluster of cells in a wireless network, where each of said one or more stations is a base station or a relay station; (b) maps the measured interference levels by building a first matrix including noise plus interference occurring at each of the one or more stations, respectively; (c) maps scheduled transmissions at predetermined times by each relay station respectively by building a second matrix; and (d) determines a noise plus interference impact upon each base station by each relay station by multiplying the first matrix by the second matrix at various points in time.

Various embodiments of the present invention provide a method and apparatus which (a) measures interference levels occurring in one or more stations in an Institute of Electrical and Electronics Engineers (IEEE) 802.16 system, each station of said one or more stations being a base station or a relay station; (b) maps the measured interference levels by building a first matrix including noise plus interference occurring at each of the one or more stations, respectively; (c) maps scheduled transmissions at predetermined times by each relay station respectively by building a second matrix; and (d) determines a noise plus interference impact upon each base station by each relay station by multiplying the first matrix by the second matrix. Thereby, various embodiments of the present invention are capable of generating a network schedule, based on the determined noise plus interference impact.

Various embodiments of the present invention are capable of (a) scheduling a maintenance mode; (b) transmitting, from one or more stations, respective network interference mapping patterns; (c) measuring a burst power of each of the transmitted mapping patterns, respectively, upon receiving the transmitted mapping patterns; and (d) determining an interference level occurring at each of the one or more stations transmitting a mapping pattern based on the measured burst power transmitted by the respective station.

Various embodiments of the present invention provide a method and apparatus which (a) defines another cluster of cells; and (b) repeats the measuring, mapping by building a first matrix, mapping building a second matrix, and determining for one or more stations in the other cluster of cells, where one or more new clusters of cells are defined after predetermined periods of time, and the measuring, mapping by building a first matrix, mapping building a second matrix, and determining are repeated for one or more stations in the one or more new clusters of cells until interference levels occurring at all stations in all cells in the wireless network are measured.

Various embodiments of the present invention are applicable to IEEE 802.16 networks, which includes amendments or extensions to IEEE 802.16. However, the present invention is not limited to IEEE 802.16 networks, and is applicable to other types of networks. The IEEE 802.16 standard, including amendments and extensions, is incorporated herein by reference.

Similarly, various embodiments of the present invention are applicable to OFDMA networks. However, the present invention is not limited to OFDMA networks, and is applicable to other types of networks.

Various embodiments of the present invention are described herein with respect to "mobile" stations that communicate with base stations and relay stations in a network. However, the present invention is not limited to networks with "mobile" stations. Instead, a network might have many different types of stations, typically referred to as "subscriber" stations, which communicate with base and/or relay stations. A "mobile" station is one type of "subscriber" station.

According to embodiments of the present invention, the above described methods, apparatuses and systems can, for example, mitigate the intranet interference between different stations (either base stations or relay stations) operating within the wireless network (e.g., an OFDMA network), thereby optimizing CINR degradation and thus allowing higher coding rates to be used on the impacted links, and cause a related improvement on the spectral efficiency per link, considering the improvement in the related bandwidth efficiency.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:
   measuring interference levels occurring at one or more stations in a cluster of cells in a wireless network, where each of said one or more stations is a base station or a relay station;
   mapping the measured interference levels by building a first matrix including noise plus interference occurring at each of the one or more stations, respectively;
   mapping scheduled transmissions at predetermined times by each relay station respectively by building a second matrix; and
   determining a noise plus interference impact upon each base station by each relay station by multiplying the first matrix by the second matrix at various times.

2. The method as in claim 1, wherein the network is an Institute of Electrical and Electronics Engineers (IEEE) 802.16 Orthogonal Frequency Division Multiple Access (OFDM) system.

3. The method of claim 1, wherein said measuring comprises:
   scheduling a maintenance mode;
   transmitting, from one or more stations, respective network interference mapping patterns;
   measuring respective powers of related bursts of each of the transmitted mapping patterns upon receiving the transmitted mapping patterns; and
   determining an interference level occurring at each of the one or more stations transmitting a mapping pattern based on the measured burst power transmitted by the respective station.

4. The method of claim 3, wherein the network interference mapping patterns are transmitted using a constant power.

5. The method of claim 3, wherein the maintenance mode is scheduled at predetermined intervals.

6. The method of claim 3, wherein the measured interference level occurring at each of the one or more stations is determined based on respective averaged burst powers.

7. The method of claim 3, wherein
   each network interference mapping pattern is defined over one symbol for a predetermined frequency band, and
   each station transmitting a network interference mapping pattern uses a unique frequency band.

8. The method of claim 3, wherein
   the burst power measurements are executed by one or more base stations or one or more super-ordinated relay stations.

9. The method of claim 7, wherein each symbol, in which a network interference mapping pattern is transmitted, is followed by a silence zone of one symbol.

10. The method of claim 1, wherein the wireless network is synchronized in frequency and time.

11. The method of claim 1, further comprising:
    defining another cluster of cells; and
    repeating the measuring, mapping by building a first matrix, mapping building a second matrix, and determining for one or more stations in the other cluster of cells.

12. The method of claim 11, wherein
    one or more new clusters of cells are defined after predetermined periods of time, and
    the measuring, mapping by building a first matrix, mapping building a second matrix, and determining are repeated for one or more stations in the one or more new clusters of cells until interference levels occurring at all stations in all cells in the wireless network are measured.

13. The method of claim 12, wherein the interference levels are measured periodically when the network is not congested.

14. The method of claim 12, wherein the interference levels are repeatedly measured and averaged over a predetermined period of time.

15. A method comprising:
    measuring interference levels occurring in one or more stations in an Institute of Electrical and Electronics Engineers (IEEE) 802.16 system, each station of said one or more stations being a base station or a relay station;
    mapping the measured interference levels by building a first matrix including noise plus interference occurring at each of the one or more stations, respectively;
    mapping scheduled transmissions at predetermined times by each relay station respectively by building a second matrix; and
    determining a noise plus interference impact upon each base station by each relay station by multiplying the first matrix by the second matrix.

16. An apparatus comprising:
    means for measuring interference levels occurring at one or more stations in a wireless network, where each of said one or more stations is a base station or a relay station;
    means for mapping the measured interference levels by building a first matrix including noise plus interference occurring at each of the one or more stations, respectively;

means for mapping scheduled transmissions at predetermined times by each relay station respectively by building a second matrix; and means for determining a noise plus interference impact upon each base station by each relay station by multiplying the first matrix by the second matrix.

17. A system for generating a reuse group based on interference levels in an Institute of Electrical and Electronics Engineers (IEEE) 802.16 network, comprising:

means for scheduling a maintenance mode;

means for transmitting, from one or more stations, respective network interference mapping patterns;

means for measuring a burst power of each of the transmitted mapping patterns, respectively, upon receiving the transmitted mapping patterns;

means for determining an interference level occurring at each of the one or more stations transmitting a mapping pattern based on the respective measured burst power;

means for mapping the determining interference levels by building a first matrix including noise plus interference occurring at each of the one or more stations, respectively;

means for mapping scheduled transmissions at predetermined times by each relay station respectively by building a second matrix;

means for determining a noise plus interference impact upon each base station by each relay station by multiplying the first matrix by the second matrix; and means for generating a network schedule, by a network management entity, based on the determined noise plus interference impact, wherein the measuring, mapping by building a first matrix, mapping by building a second matrix, and determining are repeated for interference levels occurring at the one or more stations in the cluster of cells caused by one or more stations in another cluster of cells.

* * * * *

UNITED STATES PATENT AND TRADEMARK OFFICE
CERTIFICATE OF CORRECTION

| | | |
|---|---|---|
| PATENT NO. | : 7,643,429 B2 | Page 1 of 1 |
| APPLICATION NO. | : 11/777566 | |
| DATED | : January 5, 2010 | |
| INVENTOR(S) | : Chenxi Zhu et al. | |

It is certified that error appears in the above-identified patent and that said Letters Patent is hereby corrected as shown below:

Column 1, Line 22, after "reference" insert --.--.

Signed and Sealed this

Thirtieth Day of March, 2010

David J. Kappos
*Director of the United States Patent and Trademark Office*